(12) United States Patent
Cai

(10) Patent No.: US 11,388,806 B2
(45) Date of Patent: Jul. 12, 2022

(54) LIGHTING SYSTEM FOR INDOOR GROW APPLICATION AND LIGHTING FIXTURES THEREOF

(71) Applicant: HGCI, Inc., Las Vegas, NV (US)

(72) Inventor: Dengke Cai, Camas, WA (US)

(73) Assignee: HGCI, Inc., Las Vegas, NV (US)

( * ) Notice: Subject to any disclaimer, the term of this patent is extended or adjusted under 35 U.S.C. 154(b) by 0 days.

(21) Appl. No.: 17/536,653

(22) Filed: Nov. 29, 2021

(65) Prior Publication Data

US 2022/0174802 A1 Jun. 2, 2022

Related U.S. Application Data

(60) Provisional application No. 63/118,985, filed on Nov. 30, 2020.

(51) Int. Cl.
*H05B 47/18* (2020.01)
*H05B 45/50* (2022.01)
*A01G 7/04* (2006.01)

(52) U.S. Cl.
CPC ............. *H05B 47/18* (2020.01); *A01G 7/045* (2013.01); *H05B 45/50* (2020.01)

(58) Field of Classification Search
None
See application file for complete search history.

(56) References Cited

U.S. PATENT DOCUMENTS

| | | | |
|---|---|---|---|
| 7,400,095 B2 | 7/2008 | Meckler et al. | |
| 2002/0186564 A1 | 12/2002 | Li | |
| 2012/0194089 A1* | 8/2012 | Sun | H05B 45/10 315/200 R |
| 2015/0282270 A1* | 10/2015 | Loveridge | H05B 47/10 315/224 |
| 2015/0351205 A1 | 12/2015 | Clark et al. | |
| 2017/0034895 A1 | 2/2017 | Vogel | |
| 2019/0335551 A1 | 10/2019 | Williams et al. | |
| 2020/0323057 A1* | 10/2020 | Adams | H05B 47/185 |
| 2020/0359482 A1 | 11/2020 | Cai et al. | |

FOREIGN PATENT DOCUMENTS

WO 2009029960 A2 3/2009

OTHER PUBLICATIONS

Rodriquez, Kari; International Search Report and Written Opinion of the International Searching Authority, issued in International Application No. PCT/US2021/060473; dated Feb. 8, 2022; 14 pages.

* cited by examiner

*Primary Examiner* — Anh Q Tran
(74) *Attorney, Agent, or Firm* — Ulmer & Berne LLP

(57) ABSTRACT

A light fixture for an indoor grow facility is provided. The light fixture includes a plurality of LED lights, an LED driver circuit electrically coupled with the plurality of LED lights, and a controller that transmits a driver signal to the LED driver circuit for controlling operation of the plurality of LED lights. The controller receives a digital control signal and an analog control signal and is configured to determine whether a failure condition exists for the digital control signal to determine whether to use the digital control signal or the analog control signal for controlling the LED lights. That controller additionally or alternatively includes a conversion module that is configured to receive an original control signal and generate a secondary analog control signal and a secondary digital control signal from the original control signal.

16 Claims, 7 Drawing Sheets

US 11,388,806 B2

LIGHTING SYSTEM FOR INDOOR GROW APPLICATION AND LIGHTING FIXTURES THEREOF

REFERENCE TO RELATED APPLICATION

This application claims priority of U.S. provisional patent application Ser. No. 63/118,985, entitled Lighting System for Indoor Grow Application and Lighting Fixtures Thereof, filed Nov. 30, 2020, and hereby incorporates this provisional patent application by reference herein in its entirety.

TECHNICAL FIELD

The apparatus described below generally relates to a lighting system for an indoor grow application. The lighting system includes a plurality of light fixtures that communicate with a remote controller.

BACKGROUND

Indoor grow facilities, such as greenhouses, include light fixtures that provide artificial lighting to plants for encouraging growth. These light fixtures typically include a plurality of LEDs that are controlled in zones by a remote controller.

BRIEF DESCRIPTION OF THE DRAWINGS

Various embodiments will become better understood with regard to the following description, appended claims and accompanying drawings wherein:

DETAILED DESCRIPTION

Figure 1:
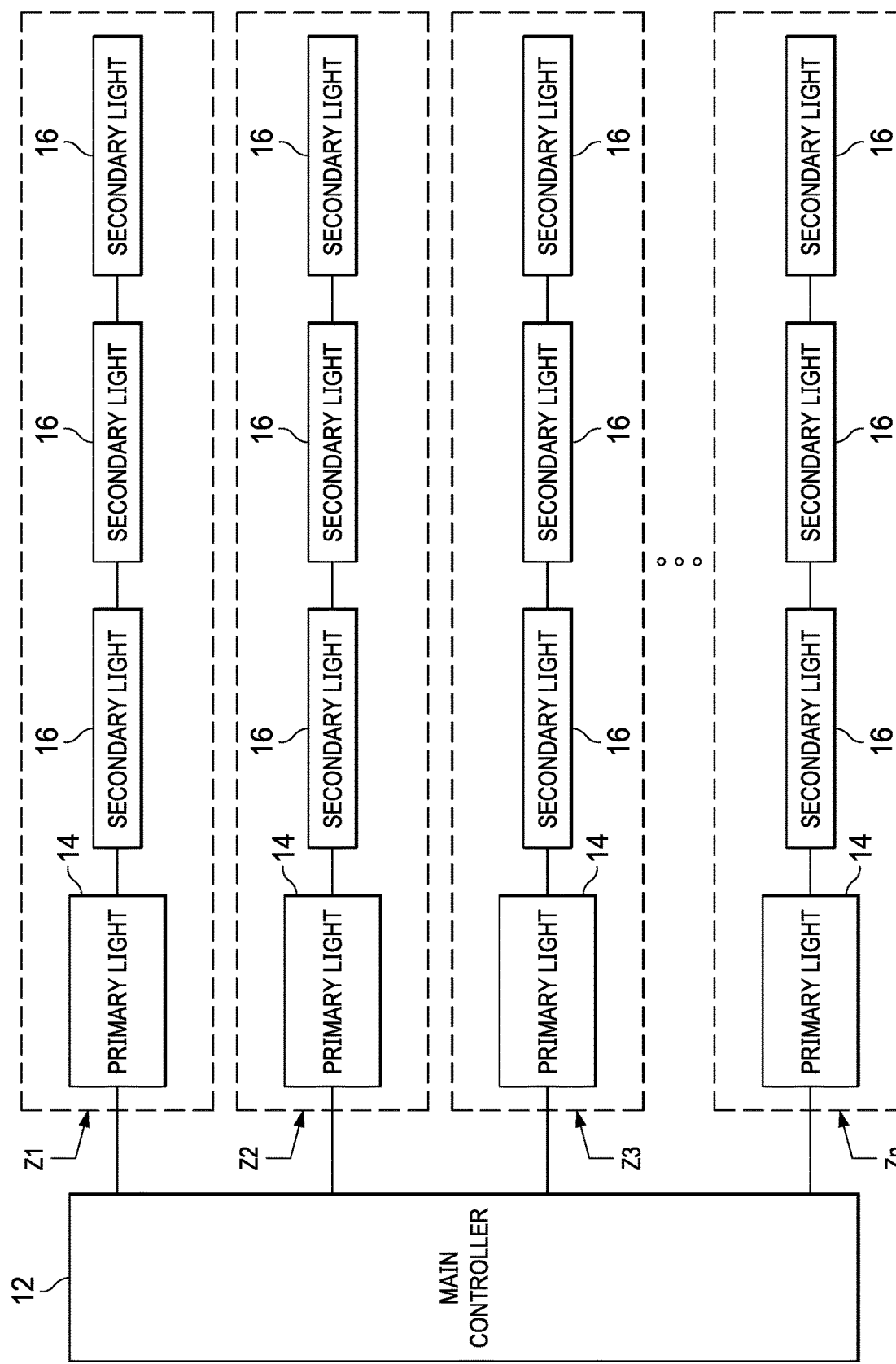
FIG. 1 is a schematic view depicting a lighting system that includes a plurality of primary light fixtures and a plurality of secondary light fixtures, in accordance with one embodiment.

Embodiments are hereinafter described in detail in connection with the views and examples of FIGS. 1-7, wherein like numbers indicate the same or corresponding elements throughout the views. A lighting system 10 for an indoor grow facility (e.g., a greenhouse) is generally depicted in FIG. 1 and is shown to include a main controller (e.g., automated greenhouse controller) 12 and a plurality of primary light fixtures 14 in signal communication with the main controller 12. Each of the primary light fixtures 14 can be in signal communication with a plurality of secondary light fixtures 16. The primary light fixtures 14 and the secondary light fixtures 16 can be arranged within an indoor grow facility and controlled by the main controller 12 to generate artificial light for stimulating growth of plants and/or other vegetation provided in the indoor grow facility. The primary light fixtures 14 and the secondary light fixtures 16 can comprise LED-light fixtures, non-LED light fixtures (e.g., HID lights or xenon lights) or some combination thereof.

Each primary light fixture 14 and the secondary light fixtures 16 connected thereto (e.g., the "connected secondary light fixtures 16") can define respective lighting zones (Z1, Z2 . . . Zn). Each lighting zone (Z1, Z2 . . . Zn) can represent a different physical lighting location within an indoor grow facility. In one embodiment, the light fixtures 14, 16 in each zone (Z1, Z2 . . . Zn) can be physically separated from the light fixtures 14, 16 of the other zones such that each zone is responsible for lighting different physical locations within the indoor grow facility. In another embodiment, the light fixtures 14, 16 of one zone (Z1, Z2 . . . Zn) can be intermingled with the light fixtures 14, 16 of other zones such that two or more of the zones cooperate with each other to light the same physical location within the indoor grow facility.

Figure 2:
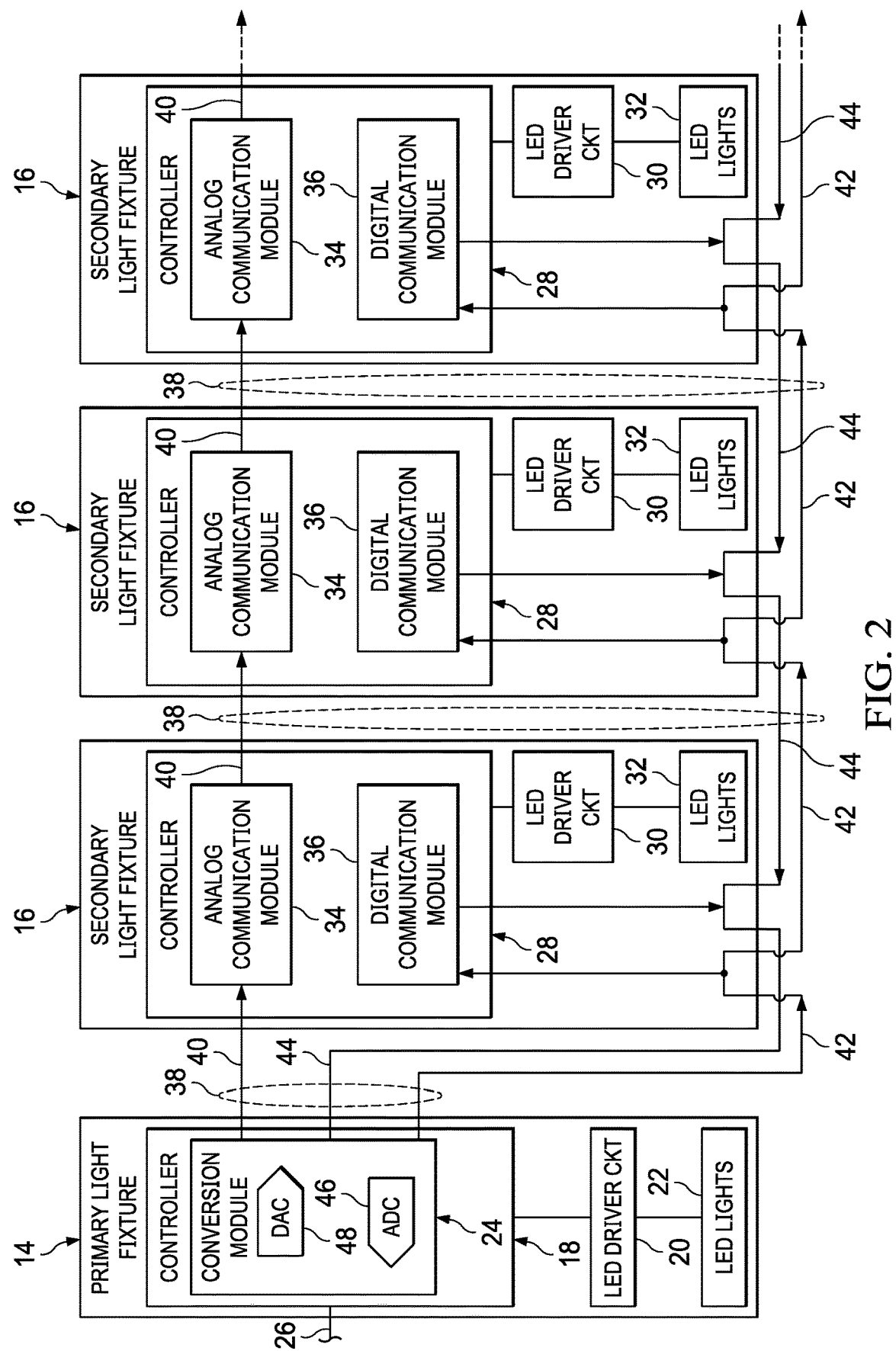
FIG. 2 is a schematic view depicting one of the primary light fixtures and certain ones of the secondary light fixtures of FIG. 1.

As will be described in further detail below, the main controller 12 can transmit an original control signal to each of the primary light fixtures 14 to control the dimming (e.g., lighting intensity) of the light fixtures 14, 16 on a zone-by-zone basis. Referring now to FIG. 2, the light fixtures 14, 16 of zone Z1 are illustrated and can be understood to be representative of the light fixtures 14, 16 in the other zones. The primary light fixture 14 can include a controller 18, an LED driver circuit 20 in communication with the controller 18, and LED lights 22 that are electrically coupled with the LED driver circuit 20. The controller 18 can include a conversion module 24 and can be communicatively coupled with the main controller 12 via a communication cable 26 which can facilitate routing of the original control signal to the controller 18.

Each of the secondary light fixtures 16 can include a controller 28, an LED driver circuit 30 in communication with the controller 28, and LED lights 32. Each of the controllers 28 can include an analog communication module 34 and a digital communication module 36. The secondary light fixtures 16 can be communicatively coupled with each other and with the main controller 12 by a plurality of communication cables 38. Each communication cable 38 can comprise an analog signal line 40, a digital transmit signal line 42, and a digital receive signal line 44. The analog communication modules 34 of each of the secondary light fixtures 16 can be communicatively coupled together in series with the conversion module 24 via the analog signal lines 40. The digital communication modules 36 of each of the secondary light fixtures 16 can be communicatively daisy chained together with the conversion module 24 via the digital transmit signal lines 42. The digital receive signal lines 44 can provide a return communication path for the transmission of data (such as from the light fixtures 14, 16 to the main controller 12). It is to be appreciated that the communication cables 38 can interface with communication ports (not shown) that are provided on each of the primary and secondary light fixtures 14, 16. In one embodiment, the communication cables 26, 38 can comprise Category 6 (Cat-6) cables. It is also to be appreciated that the series connections between the analog communication modules 34 and the daisy chained connections between the digital communication modules 36 can be achieved via internal wiring within in the secondary light fixtures 16.

The original control signal can be transmitted from the main controller 12 to the primary light fixture 14 to facilitate control of the lighting intensity of the LED lights 22, 32. The original control signal can be routed to the controller 18 of the primary light fixture 14 which can control the LED lights 22 to achieve the intensity requested by the original control signal. The original control signal can also be routed to the conversion module 24 which can simultaneously generate an analog version of the original control signal (e.g., a secondary analog control signal) and a digital version of the original control signal (e.g., a secondary digital control signal) that are both capable of controlling the LED lights 32 of the secondary light fixtures 16 to achieve the intensity requested by the original control signal.

The secondary analog control signal can be transmitted from the conversion module 24 to each of the analog communication modules 34 along the analog signal lines 40 of the communication cables 38. Each analog communication module 34 can be configured to facilitate control of the LED lights 32 associated thereto to achieve the intensity requested by the secondary analog control signal. Each of the analog communication modules 34 can be configured to amplify the analog version of the control signal to compensate for any degradation that may occur during transmission to each of the secondary light fixtures 16.

The secondary digital control signal can be transmitted from the conversion module 24 to each of the digital communication modules 36 along the digital transmit signal lines 42 of the communication cables 38. Each digital communication module 36 can be configured to facilitate control of the LED lights 32 associated therewith to achieve the intensity requested by the secondary digital control signal. Due to the nature of the transmission of the secondary digital control signal along the digital transmit signal lines 42 and the daisy chained connection between the digital communication modules 36, the digital signals might not require amplification to reach each of the secondary light fixtures 16. In one embodiment, each of the secondary light fixtures 16 can have a unique address (e.g., an IP address). In such an embodiment, the secondary digital control signal can include unique instructions (e.g., packets) for the LED lights 32 that enable the intensity of each of the LED lights 32 of the secondary light fixture 16 in a particular zone to be independently controlled.

The secondary analog control signal and the secondary digital control signal can be transmitted to each of the secondary light fixtures 16 to provide redundancy for the secondary light fixtures 16. If the transmission of either of the secondary analog control signal or the secondary digital control signal is somehow interrupted (e.g., due to failure of an internal component, external signal interference, or failure of one of the analog signal lines 40 or the digital transmit signal lines 42), the controller 28 can use the other secondary control signal to operate the secondary light fixtures 16, thereby maintaining the overall integrity of the lighting system 10 until the communication system can be repaired. In one embodiment, the secondary digital control signal can be the primary mode for controlling the secondary light fixtures 16. In such an embodiment, when both of the secondary digital control signal and the secondary analog control signal are present at the secondary light fixtures 16, the secondary digital control signal can control the intensity of the LED lights 32. However, if the secondary digital control signal is somehow interrupted for one or more of the secondary light fixtures 16, the secondary analog control signal can then control the intensity of the LED lights 32 that are no longer able to receive the secondary digital control signal.

The original control signal can comprise either an analog signal (e.g., 0-10 VDC, 0-20 VDC, 4-20 mA, 0-20 mA) or a digital signal (e.g., RS-485, ModBus, BacNET, CamNET, ASCII) depending upon the configuration of the main controller 12. The controller 18 can be configured to detect whether the original control signal is an analog signal or a digital signal. If the original control signal is an analog signal, the controller 18 can generate the secondary analog control signal by presenting the original control signal as the secondary analog control signal, and the conversion module 24 can generate the secondary digital control signal by converting the original control signal from an analog signal into a digital signal. If the original control signal is a digital signal, the controller 18 can generate the secondary digital control signal by presenting the original control signal as the secondary digital control signal, and the conversion module 24 can generate the secondary analog control signal by converting the original control signal from a digital signal into an analog digital signal. In one embodiment, as illustrated in FIG. 2, the conversion module 24 of the primary light fixture 14 can include an analog to digital converter (ADC) 46 and a digital to analog converter (DAC) 48. The ADC 46 can facilitate conversion of the original control signal from an analog signal into digital signal. The DAC 48 can facilitate conversion of the original control signal from a digital signal into an analog signal. When the original control signal is converted from a digital signal into an analog signal, the digital information transmitted by the digital signal (i.e., addressing information) can be lost.

In one embodiment, the original control signal generated by the main controller 12 can be an LED-compatible signal that is capable of directly controlling the intensity of the LED lights 22, 32. In such an embodiment, the controller 18 can be configured to detect whether the original control signal is a compatible signal. In another embodiment, the original control signal generated by the main controller 12 can be an incompatible signal that is not capable of directly controlling the intensity of the LED lights 22, 32 (e.g., when the light fixtures 14, 16 are LED light fixtures and are retrofit onto a main controller that is only compatible with non-LED type lights such as HID lights). The controller 18 can be configured to detect whether the original control signal is compatible or incompatible with the light fixtures 14, 16.

If the controller 18 determines that the original control signal is compatible with the light fixtures 14, 16, the original control signal can be passed directly through to the light fixtures 14, 16 for presentation as either the secondary analog control signal or the secondary digital control signal (depending upon whether the original control signal is an analog signal or a digital signal). For example, when the original control signal is an analog signal and is determined to be compatible with the light fixtures 14, 16, the controller 18 can pass the original control signal directly through for presentation to the light fixtures 14, 16 as the secondary analog control signal (e.g., along the analog signal lines 40). When the original control signal is a digital signal and is determined to be compatible with the light fixtures 14, 16, the controller 18 can pass the original control signal directly through for presentation to the light fixtures 14, 16 as the secondary digital control signal (e.g., along the digital transmit signal lines 42).

If the controller 18 determines that the original control signal is not compatible with the light fixtures 14, 16, and thus incapable of directly controlling the light fixtures 14, 16, the controller 18 can be configured to convert (e.g., translate) the original control signal into an LED-compatible control signal for use in generating the secondary analog and digital control signals. The relationship between the non-compatible original control signal transmitted by the main controller 12 and the LED-compatible control signal transmitted by the controller 18 can be a function of the respective signal protocols utilized by each of the main controller 12 and the light fixtures 14, 16. For example, the main controller 12 might conform to a HID/xenon protocol that generates a 1-10 VDC analog signal for varying the dimming of an associated HID/xenon light between 0% intensity and 100% intensity. The light fixtures 14, 16, however, might require a 1-8 VDC analog signal. In such an example, the controller 18 can be configured to generate a 1-8 VDC LED-compatible control signal based upon the dimming intensity requested by the original control signal from the main controller 12.

Various examples of the generation of the secondary analog and digital control signals from the original control signal will now be described. For purposes of these examples, the secondary analog control signal can comprise a 0-10 VDC analog signal and the secondary digital control signal can comprise an RS-485 signal that each facilitate control of the dimming of the light fixtures 14, 16 between 0% intensity and 100% intensity in order to achieve the intensity requested by the original control signal. In the first example, the original control signal can be a compatible analog signal. When the original control signal is transmitted to the controller 18, the controller 18 can route the original control signal directly to the secondary light fixtures 16 as the secondary analog control signal. The controller 18 can also convert the original control signal from an analog signal into the secondary digital control signal (via the ADC 46) which is then routed to the secondary light fixtures 16. In the second example, the original control signal can be a compatible digital signal. When the original control signal is transmitted to the controller 18, the controller 18 can route the original control signal directly to the secondary light fixtures 16 as the secondary digital control signal. Any instructions (or other data) provided by the original control signal are able to be passed through to the secondary light fixtures 16 via the secondary digital control signal. The controller 18 can also convert the original control signal from a digital signal into the secondary analog control signal (via the DAC 48) which is then routed to the secondary light fixtures 16. In the third example, the original control signal can be an analog signal that is not compatible with the light fixtures 14, 16. When the original control signal is transmitted to the controller 18, the controller 18 can convert the original control signal into an LED-compatible analog control signal which is routed to the secondary light fixtures 16 as the secondary analog control signal. The controller 18 can also convert the LED-compatible analog control signal from an analog signal into the secondary digital control signal (via the ADC 46) which is then routed to the secondary light fixtures 16. In the fourth example, the original control signal can be a digital signal that is not compatible with the light fixtures 14, 16. When the original control signal is transmitted to the controller 18, the controller 18 can convert the original control signal into an LED-compatible digital control signal which is routed to the secondary light fixtures 16 as the secondary digital control signal. Any instructions (or other data) provided by the non-compatible original control signal can also be provided to the secondary light fixtures 16 via the secondary digital control signal. The controller 18 can also convert the LED-compatible digital control signal from a digital signal into the secondary analog control signal (via the DAC 48) which is then routed to the secondary light fixtures 16.

It is to be appreciated that although the main controller 12 is described as being configured to control dimming of the light fixtures 14, 16 with the original control signal, the main controller 12 can control any of a variety of other suitable operating characteristics (e.g., scheduling and/or color mixing) with the original control signal according to the principles and details described above. It is also to be appreciated that although three secondary light fixtures are shown, any quantity of secondary light fixtures can be networked with each primary light fixture 14. In one embodiment, the primary light fixture 14 can be configured to communicate with up to 2,000 secondary light fixtures 16.

Figure 3:
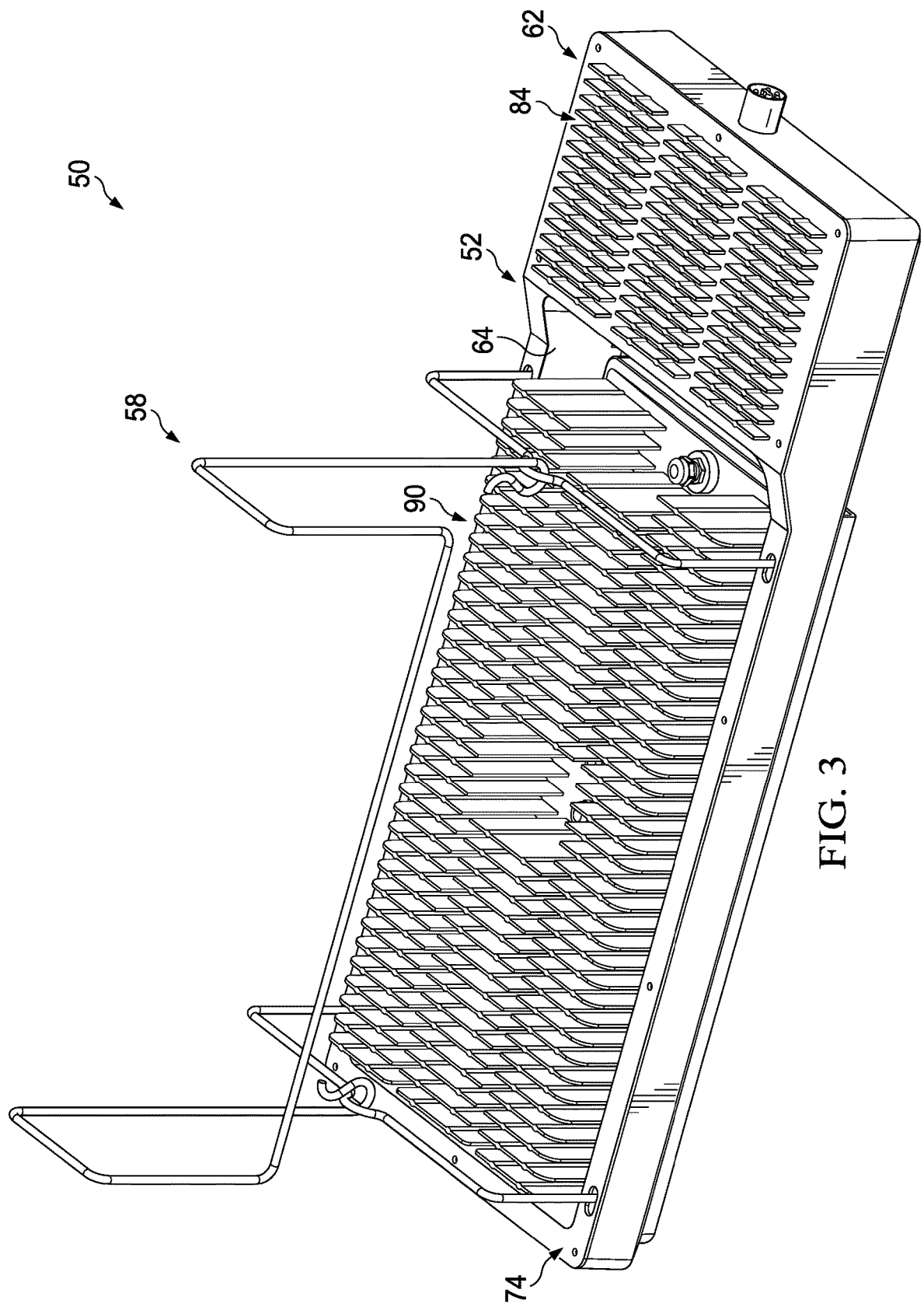
FIG. 3 is an upper isometric view depicting a light fixture, in accordance with one embodiment.
Figure 4:
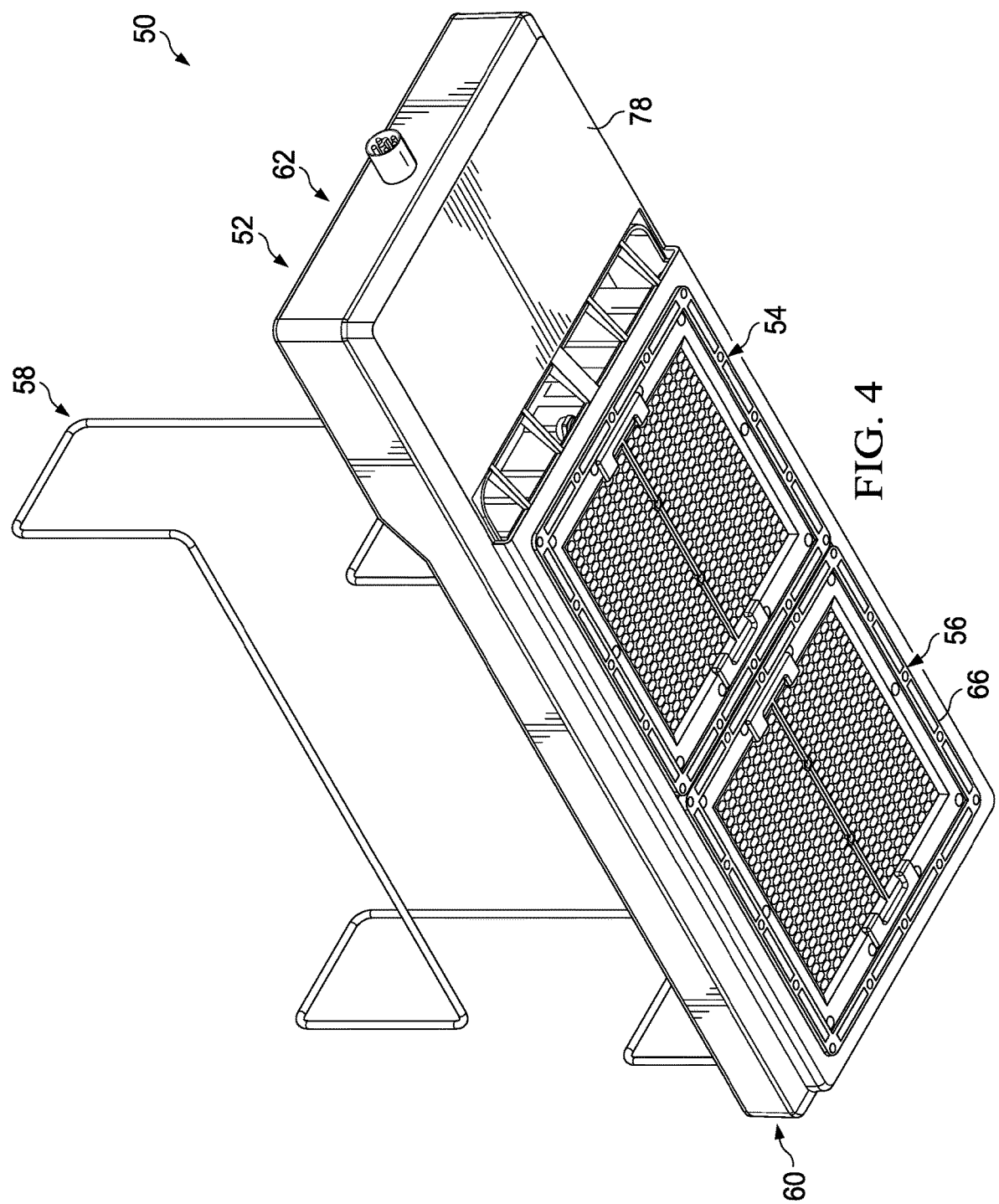
FIG. 4 is a lower isometric view of the light fixture of FIG. 3.
Figure 5:
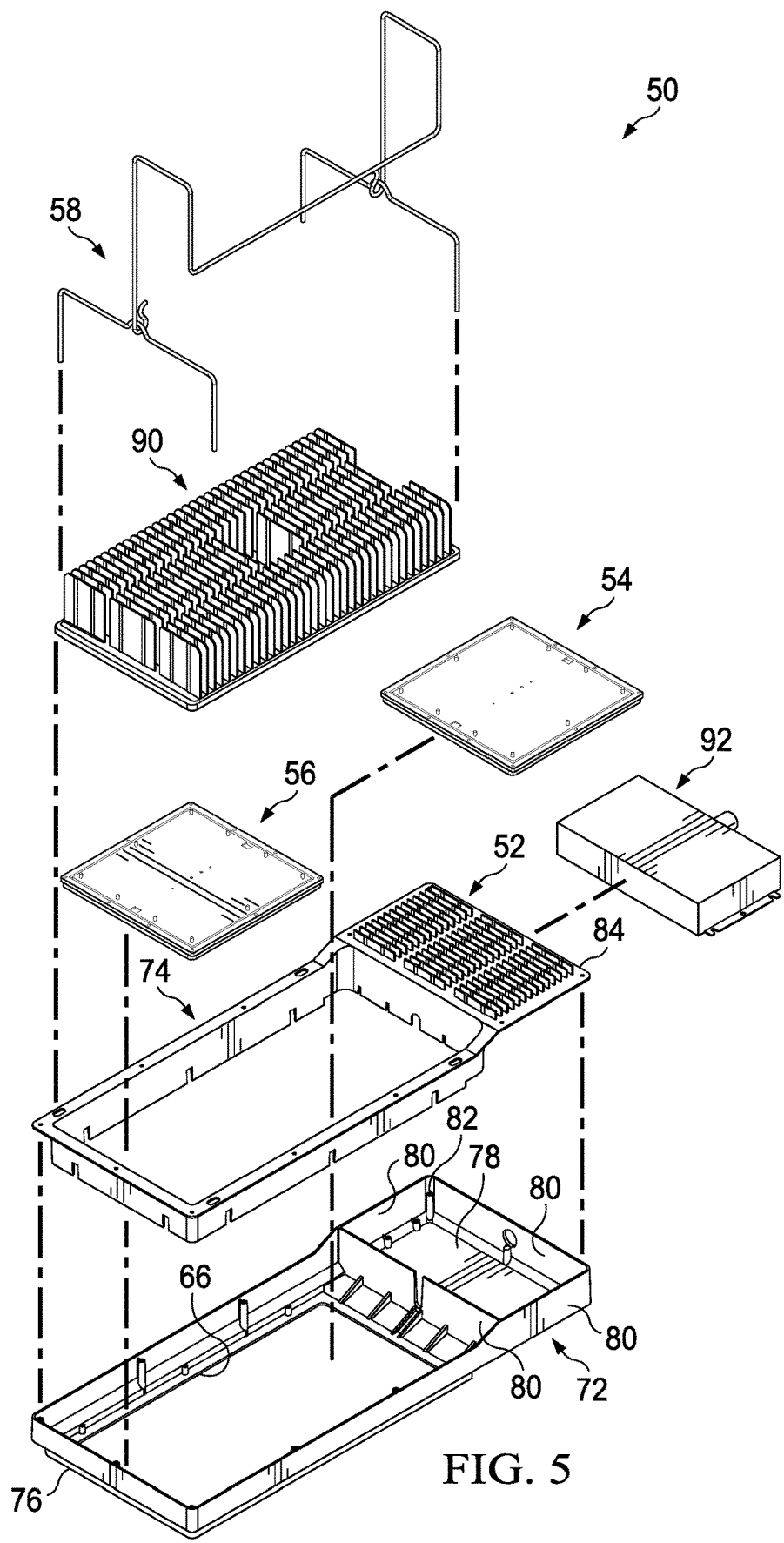
FIG. 5 is a partially exploded upper isometric view of the light fixture of FIG. 3.

One example of a universal light fixture 50 (hereinafter "light fixture") is generally depicted in FIGS. 3-5 and can include a housing 52, first and second lighting modules 54, 56 (FIG. 4), and a hanger assembly 58. The housing 52 can include a light support portion 60 and a controller support portion 62 adjacent to the light support portion 60. The light support portion 60 can define a lighting receptacle 64 (FIG. 3) and a window 66 (FIG. 4) disposed beneath the lighting receptacle 64. The first and second lighting modules 54, 56 (FIG. 2) can be disposed within the lighting receptacle 64 above the window 66 and can be configured to emit light through the window 66, as will be described in further detail below.

As illustrated in FIG. 5, the housing 52 can include a main frame 72 and a cover member 74 that overlies the main frame 72 and is coupled together with the main frame 72 via welding, adhesives, releasable tabs (not shown), fasteners (not shown), or any of a variety of suitable alternative permanent or releasable fastening arrangements. The main frame 72 can include a bottom lighting wall 76 that defines the window 66. As illustrated in FIG. 5, the main frame 72 can include a bottom controller wall 78, and a plurality of sidewalls 80 that cooperate to define a controller receptacle 82. The cover member 74 can include a lid portion 84 that overlies and covers the controller receptacle 82, as illustrated in FIG. 5. The bottom controller wall 78, the sidewalls 80, and the lid portion 84 can form at least part of the controller support portion 62 of the housing 52.

Referring now to FIGS. 3 and 5, a heat sink 90 can be disposed over each of the first and second lighting modules 54, 56 and can be configured to dissipate heat away from the first and second lighting modules 54, 56. Referring now to FIG. 5, a controller 92 can be disposed in the controller receptacle 82 and can be configured to power and control the first and second lighting modules 54, 56 according to the principles and methods described herein. As illustrated in FIG. 3, the lid portion 84 of the cover member 74 can overlie the controller receptacle 82 and the controller 92. The lid portion 84 can serve as a heat sink for the controller 92 to facilitate dissipation of heat from the controller 92.

Figure 6:
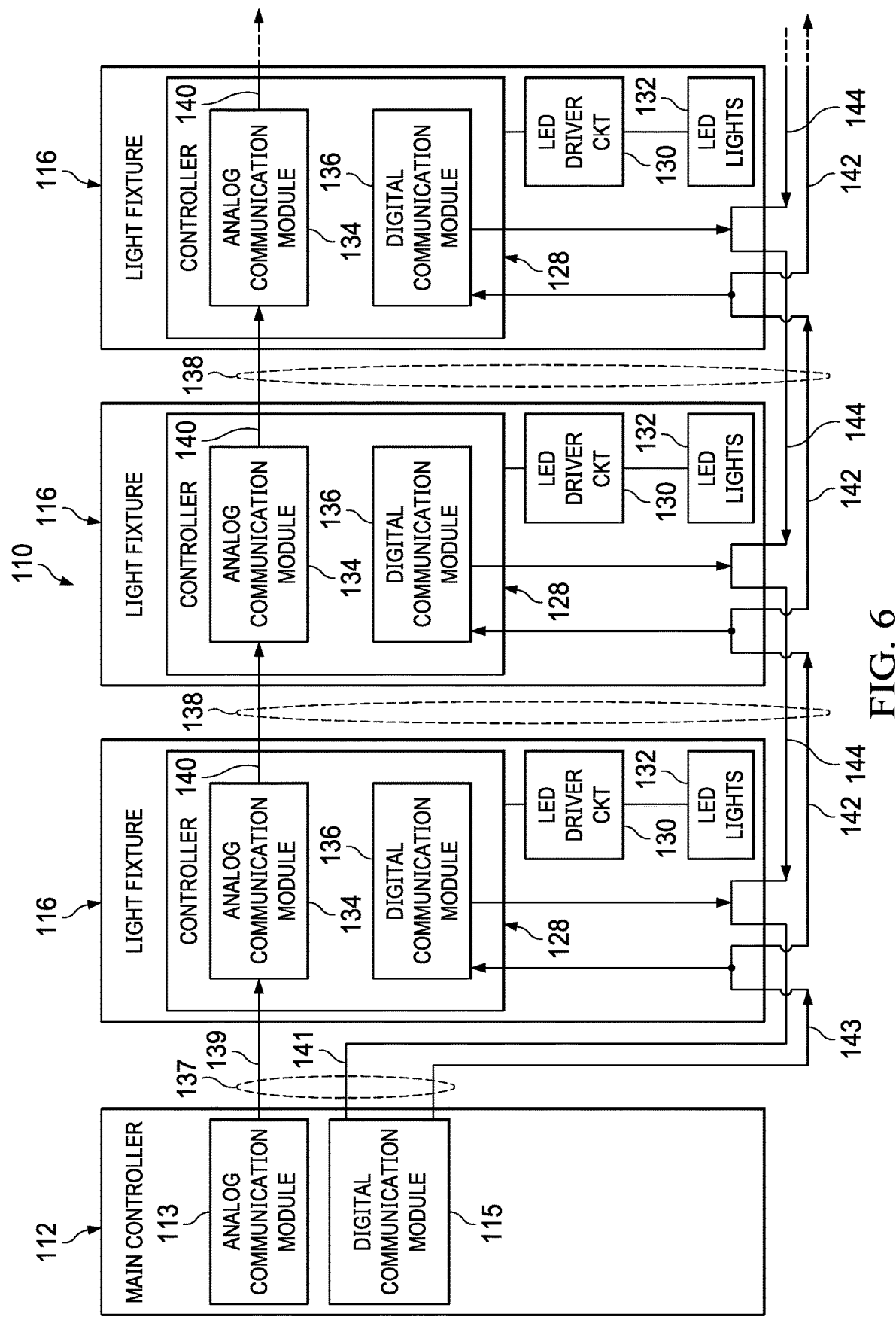
FIG. 6 is a schematic view depicting a lighting system that includes a main controller and a plurality of light fixtures, in accordance with another embodiment.

FIG. 6 illustrates an alternative embodiment of a lighting system 110 for an indoor grow facility (e.g., a greenhouse), that is similar to, or the same in many respects as the lighting system 10 illustrated in FIG. 1 above. For example, the lighting system 110 can include a main controller 112 and a plurality of light fixtures 116 in signal communication with the main controller 112. The plurality of light fixtures 116 can define an individual lighting zone (e.g., Z1, Z2 . . . Zn shown in FIG. 1).

Each of the light fixtures 116 can be similar to, or the same in many respects as, the secondary light fixtures 16 illustrated in FIG. 2. For example, each of the light fixtures 116 can include a controller 128, an LED driver circuit 130 in signal communication with the controller 128, and LED lights 132 that are electrically coupled with, and powered by, the LED driver circuit 130 (e.g., via PWM signal or a 1-9 VDC signal). The controller 128 can be configured to transmit a driver signal (e.g., a 0-10 VDC signal) to the LED driver circuit for controlling operation of the plurality of LED lights 132. The controller 128 can include an analog communication module 134 and a digital communication module 136. The analog and digital communication modules 134, 136 can be configured to simultaneously receive an analog control signal and a digital control signal, respectively, from an upstream source (e.g., the main controller 112 or one of the light fixtures 116, depending on the position of the light fixture 116 relative to the main controller 112) and transmit the analog control signal and the digital control signal, respectively, to a downstream electronic device (e.g., an adjacent one of the light fixtures 116) to facilitate simultaneous analog and digital communication, respectively, between the main controller 112 and the light fixtures 116, as will be described in further detail below.

The main controller 112 can be configured to communicate with the light fixtures 116 via simultaneous analog and digital control signals (e.g., dual mode communication) to control the dimming (e.g., lighting intensity) of the light fixtures 116. The main controller 112 can include an analog communication module 113 and a digital communication module 115 that are responsible for communicating with the light fixtures 116 via the analog signal and the digital signal, respectively. The analog and digital communication modules 113, 115 can be communicatively coupled with the analog and digital communication modules 134, 136, respectively, of a first one of the plurality of light fixtures 116 via a communication cable 137 that includes an analog signal line 139, a digital transmit signal line 141, and a digital receive signal line 143. The analog and digital communication modules 134, 136 of the light fixtures 116 can be communicatively coupled with each other via a plurality of communication cables 138 that each include an analog signal line 140, a digital transmit signal line 142, and a digital receive signal line 144.

The analog communication modules 134 of the light fixtures 116 can be communicatively coupled together in series via the analog signal lines 140 and with the analog communication module 113 of the main controller 112 via the analog signal line 139. The analog signal lines 139, 140 can cooperate to define an analog bus for the main controller 112 and the light fixtures 116. The digital communication modules 136 of the light fixtures 116 can be communicatively daisy chained together (e.g., in parallel) via the digital transmit and receive signal lines 142, 144 and with the digital communication module 115 of the main controller 112 via the digital transmit and receive signal lines 141, 143. The digital transmit signal lines 142 can provide a transmission path for the transmission of data from the main controller 112 to the light fixtures 116 and the digital receive signal lines 144 can provide a return path for the transmission of data from the light fixtures 116 to the main controller 112 such that the digital transmit and receive signal lines 142, 144 cooperate to facilitate bi-directional communication between the main controller 112 and the light fixtures 116. The digital transmit and receive signal lines 141, 143 and the digital transmit and receive signal lines 142, 144 can cooperate to define a digital bus for the main controller 112 and the light fixtures 116. It is to be appreciated that the communication cables 137, 138 can interface with communication ports (not shown) that are provided on the main controller 112 and the light fixtures 116. In one embodiment, the communication cables 137, 138 can comprise Category 6 (Cat-6) cables. It is to be appreciated that the series connections between the analog communication modules 113, 134 and the daisy chained connections between the digital communication modules 115, 136 can be achieved via internal wiring within the light fixtures 116.

The main controller 112 can simultaneously generate the analog control signal and the digital control signal via the analog communication module 113 and the digital communication module 115, respectively. The analog control signal and the digital control signal can both be capable of independently controlling the LED lights 132 of the light fixtures 116 to substantially the same intensity. The analog control signal can be transmitted from the analog communication module 113 and to each of the analog communication modules 134 of the light fixtures 116 (e.g., along the analog bus). Each of the analog communication modules 134 can be configured to amplify the analog control signal to compensate for any degradation that may occur during transmission of the analog control signal to each of the light fixtures 116.

The digital control signal can be transmitted from the digital communication module 115 and to each of the digital communication modules 136 of the light fixtures 116 (e.g., along the digital bus). Due to the nature of the transmission of the digital control signal along the digital bus and the daisy chained connection between the digital communication modules 136, the digital control signal might not require amplification to reach each of the light fixtures 116. In one embodiment, each of the light fixtures 116 can have a unique address (e.g., an IP address). In such an embodiment, the digital control signal can include unique instructions (e.g., packets) for the each of the light fixtures 116 that allows the light intensity of the LED lights 132 of each light fixture 116 to be controlled independently.

The analog control signal and the digital control signal can be transmitted to each of the light fixtures 116 simultaneously to provide redundancy for controlling the intensity of the LED lights 132 at each of the light fixtures 116. In one embodiment, the digital control signal can be the primary signal that is responsible for controlling the intensity of the LED lights 132 at each light fixture 116 and the analog control signal can be the backup signal. In such an embodiment, when both of the digital control signal and the analog control signal are capable of controlling the LED lights 132 (i.e., neither of the digital control signal and the analog control signal have failed), the digital control signal can be responsible for controlling the intensity of the LED lights 132. However, if the digital control signal has somehow failed and is thus incapable of controlling the LED lights 132, the analog control signal can then be used to control the intensity of the LED lights 132. As such, so long as the digital control signal is capable of controlling the LED lights 132 and has not failed, the intensity of the LED lights 132 is controlled with the digital control signal and the analog control signal is ignored.

Each of the light fixtures 116 can operate independently from the other light fixtures when selecting which of the analog control signal and the digital control signal to operate the LED lights 132 from. The details of the operation of one of the light fixtures 116 when selecting between the analog control signal and the digital control signal for controlling the intensity of the LED lights 132 will now be described, but can be understood to be representative of the rest of the light fixtures 116 illustrated in FIG. 6. For purposes of this description, the digital control signal can be understood to be the primary control signal that the controller 128 uses to control the LED lights 132 and the analog control signal can be considered the secondary or backup control signal that the controller 128 uses only when the digital control signal has failed and is thus incapable of controlling the LED lights 132.

The light fixture 116 can only use one of the digital control signal or the analog control signal at a given time for controlling the intensity level (e.g., the dimming intensity) of the LED lights 132, and thus is not operable to control the LED lights 132 from both signals simultaneously. When the digital control signal is selected to control the LED lights 132, the controller 128 can be configured to convert the digital control signal into the driver signal which is then transmitted to the LED driver circuit 130 for controlling the LED lights 132. When the analog control signal is selected to control the LED lights 132, the controller 128 can be configured to convert the analog control signal into the driver signal which is then transmitted to the LED driver circuit 130 for controlling the LED lights 132. The driver signal can be converted into a format (e.g., a 0-10 VDC signal) that is able to control the intensity of the LED lights 132 and includes the dimming request provided by either the digital or analog control signals.

The controller 128 can select between the digital control signal and the analog control signal depending on whether the digital control signal has failed or not. As such, the controller 128 can be configured to determine whether a failure condition exists for the digital control signal. If a failure condition doesn't exist, then the controller 128 can use the digital control signal to control the LED lights 132 (e.g., by converting the digital signal into the driver signal as described above). If a failure condition exists for the digital control signal, then the controller 128 can use the analog control signal instead to control the LED lights 132 (e.g., by converting the analog signal into the driver signal as described above).

A failure condition can be understood to be any inconsistency in the digital control signal that would cause the signal to be ineffective to properly control the LED lights 132. In one embodiment, the controller 128 can determine whether a failure condition exists for the digital control signal as a function of the presence of the digital control signal at the digital communication module 136. In such an embodiment, if the controller 128 determines that the digital control signal is present at the digital communication module 136 (i.e., no failure condition exists), then the controller 128 can use the digital control signal as the basis for the driver signal to control the LED lights 132. If the controller determines that the digital control signal is not present at the digital communication module 136 (i.e., a failure condition exists), then the controller 128 can use the analog control signal as the basis for the driver signal to control the LED lights 132. In another embodiment, the controller 128 can determine whether a failure condition exists for the digital control signal as a function of the signal strength of the digital control signal at the digital communication module 136. In such an embodiment, the controller 128 can detect the strength of the signal and compare to a predefined threshold. If the signal strength of the digital control signal is above a predefined threshold, such as 90%, for example (i.e., no failure condition exists), then the digital control signal is strong enough and the controller 128 can use the digital control signal as the basis for the driver signal to control the LED lights 132. If the signal strength of the digital control signal is below the predefined threshold (i.e., a failure condition exists), then the digital control signal is too weak and the controller 128 can use the analog control signal as the basis for the driver signal to control the LED lights 132. In yet another embodiment, the controller 128 can determine whether a failure condition exists for the digital control signal as a function of the integrity of the digital control signal at the digital communication module 136. In such an embodiment, the controller 128 can detect the error rate of the signal and compare to a predefined threshold. If the error rate of the digital control signal is below a predefined threshold, such as 1%, for example (i.e., no failure condition exists), then the digital control signal is accurate enough and the controller 128 can use the digital control signal as the basis for the driver signal to control the LED lights 132. If the error rate of the digital control signal is above the predefined threshold (i.e., a failure condition exists), then the digital control signal is too inaccurate and the controller 128 can use the analog control signal as the basis for the driver signal to control the LED lights 132. It is to be appreciated that the controller 128 can determine a failure condition based upon any of a variety of suitable additional or alternative criteria and that multiple criteria can be used at the same time. It is also to be appreciated that by using redundant digital and analog signals, the light fixture 116 can be less prone to communication faults, and can thus be more stable than conventional LED light fixtures.

Figure 7:
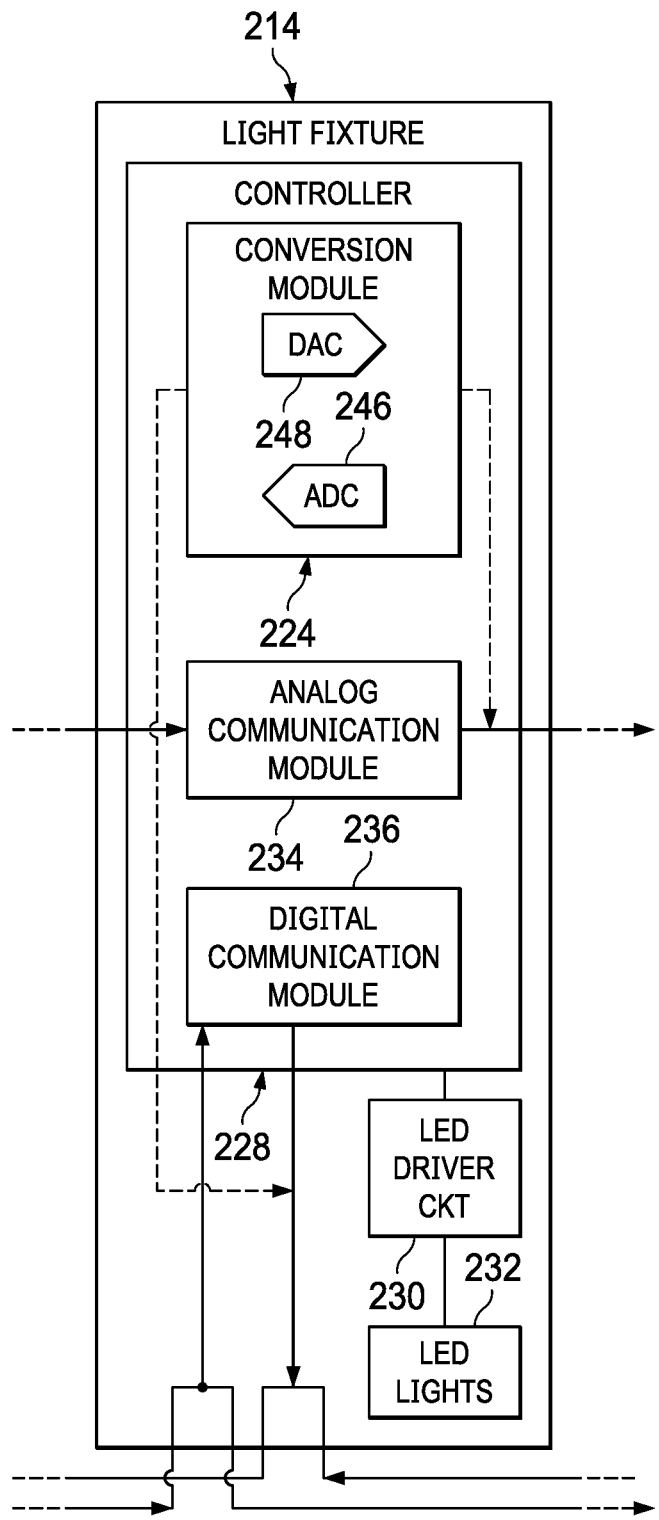
FIG. 7 is a schematic view depicting a light fixture in accordance with another embodiment.

FIG. 7 illustrates an alternative embodiment of a light fixture 214 (e.g., a universal light fixture), that is similar to, or the same in many respects as the primary and secondary light fixtures 14, 16, illustrated in FIGS. 1 and 2 above. For example, the light fixture 214 can include a controller 228, an LED driver circuit 220 in communication with the controller 228, and LED lights 232 that are electrically coupled with the LED driver circuit 230. The controller 228 can include a conversion module 224 that includes an analog to digital converter (ADC) 246 and a digital to analog converter (DAC) 248. The controller 228 can also include an analog communication module 234 and a digital communication module 236.

The controller 228 can include all of the features of the controllers 18, 28, 128 described above and that can be selectively programmed (e.g., through remote programming) to allow the light fixture 214 to be used as either a converting light fixture (e.g., the primary light fixture 14) or as a pass-through light fixture (e.g., the secondary light fixture 16 or the light fixture 116).

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A light fixture for an indoor grow facility, the light fixture comprising:
   a plurality of LED lights;
   an LED driver circuit electrically coupled with the plurality of LED lights; and
   a controller in signal communication with the LED driver circuit and configured to transmit a driver signal to the LED driver circuit for controlling operation of the plurality of LED lights, the controller comprising:
a digital communication module configured to receive a digital control signal from a remote source and transmit the digital control signal to a downstream electronic device; and
an analog communication module configured to receive an analog control signal from the remote source simultaneously with the digital control signal and transmit the analog control signal to the downstream electronic device, wherein:
the controller is configured to determine whether a failure condition exists for the digital control signal;
when the failure condition does not exist, the controller converts the digital control signal into the driver signal; and
when the failure condition exists, the controller converts the analog control signal into the driver signal.

2. The light fixture of claim 1 wherein:
the controller is configured to determine whether the failure condition exists for the digital control signal as a function of a presence of the digital control signal at the digital communication module;
when the digital control signal is present at the digital communication module, the controller converts the digital control signal into the driver signal; and
when the digital control signal is not present at the digital communication module, the controller converts the digital control signal into the driver signal.

3. The light fixture of claim 1 wherein:
the controller is configured to determine whether the failure condition exists for the digital control signal as a function of a signal strength of the digital control signal at the digital communication module;
when the signal strength of the digital control signal is above a predefined threshold, the controller converts the digital control signal into the driver signal; and
when the signal strength of the digital control signal is below the predefined threshold, the controller converts the digital control signal into the driver signal.

4. The light fixture of claim 1 wherein:
the controller is configured to determine whether the failure condition exists for the digital control signal as a function of an error rate of the digital control signal at the digital communication module;
when the error rate of the digital control signal is below a predefined threshold, the controller converts the digital control signal into the driver signal; and
when the error rate of the digital control signal is above the predefined threshold, the controller converts the digital control signal into the driver signal.

5. The light fixture of claim 1 wherein the analog control signal comprises a 0-10 VDC signal and the digital control signal comprises an RS-485 signal.

6. The light fixture of claim 1 wherein the analog communication module is configured to amplify the analog control signal.

7. A lighting system for an indoor grow facility, the lighting system comprising:
a main controller that is configured to generate an analog control signal and a digital control signal; and
a light fixture comprising:
a plurality of LED lights;
an LED driver circuit electrically coupled with the plurality of LED lights; and
a controller in signal communication with the LED driver circuit and configured to transmit a driver signal to the LED driver circuit for controlling operation of the plurality of LED lights, the controller comprising:
a digital communication module in signal communication with the main controller for receiving the digital control signal and configured to transmit the digital control signal to a downstream light fixture; and
an analog communication module in signal communication with the main controller for receiving the analog control signal simultaneously with the digital control signal and configured to transmit the analog control signal to the downstream light fixture, wherein:
the controller of the light fixture is configured to determine whether a failure condition exists for the digital control signal;
when the failure condition does not exist, the controller of the light fixture converts the digital control signal into the driver signal; and
when the failure condition exists, the controller of the light fixture converts the analog control signal into the driver signal.

8. The lighting system of claim 7 wherein:
the controller of the light fixture is configured to determine whether the failure condition exists for the digital control signal as a function of a presence of the digital control signal at the digital communication module;
when the digital control signal is present at the digital communication module, the controller of the light fixture converts the digital control signal into the driver signal; and
when the digital control signal is not present at the digital communication module, the controller of the light fixture converts the digital control signal into the driver signal.

9. The lighting system of claim 7 wherein:
the controller of the light fixture is configured to determine whether the failure condition exists for the digital control signal as a function of a signal strength of the digital control signal at the digital communication module;
when the signal strength of the digital control signal is above a predefined threshold, the controller of the light fixture converts the digital control signal into the driver signal; and
when the signal strength of the digital control signal is below the predefined threshold, the controller of the light fixture converts the digital control signal into the driver signal.

10. The lighting system of claim 7 wherein:
the controller of the light fixture is configured to determine whether the failure condition exists for the digital control signal as a function of an error rate of the digital control signal at the digital communication module;
when the error rate of the digital control signal is below a predefined threshold, the controller of the light fixture converts the digital control signal into the driver signal; and
when the error rate of the digital control signal is above the predefined threshold, the controller of the light fixture converts the digital control signal into the driver signal.

11. The lighting system of claim 7 wherein the analog control signal comprises a 0-10 VDC signal and the digital control signal comprises an RS-485 signal.

12. The lighting system of claim 7 wherein the analog communication module is configured to amplify the analog control signal.

13. A light fixture for an indoor grow facility, the light fixture comprising:
- a plurality of LED lights;
- an LED driver circuit electrically coupled with the plurality of LED lights; and
- a controller in signal communication with the LED driver circuit and configured to transmit a driver signal to the LED driver circuit for controlling operation of the plurality of LED lights, the controller comprising a conversion module that is configured to receive an original control signal from a remote source and generate a secondary analog control signal and a secondary digital control signal from the original control signal for transmission to a downstream electronic device.

14. The light fixture of claim 13 wherein:
- the controller is configured to detect whether the original control signal is an analog signal or a digital signal;
- when the original control signal is an analog signal, the controller is configured to present the original control signal as the secondary analog control signal, and the conversion module is configured to convert the original control signal into secondary digital control signal; and
- when the original control signal is a digital signal, the controller is configured to present the original control signal as the secondary digital control signal, and the conversion module is configured to convert the original control signal into the secondary analog control signal.

15. The light fixture of claim 13 wherein the conversion module comprises:
- an analog to digital converter that facilitates conversion of the original control signal from an analog signal into the secondary digital control signal; and
- a digital to analog converter that facilitates conversion of the original control signal from a digital signal into the secondary analog control signal.

16. The light fixture of claim 13 wherein the secondary analog control signal comprises a 0-10 VDC signal and the secondary digital control signal comprises an RS-485 signal.

* * * * *